US007675728B2

(12) United States Patent
Woodworth et al.

(10) Patent No.: US 7,675,728 B2
(45) Date of Patent: Mar. 9, 2010

(54) FIRE SAFE ARRESTER ISOLATOR

(75) Inventors: Jonathan Jay Woodworth, Olean, NY (US); James A. Strong, Olean, NY (US); David R. Miller, Allegany, NY (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 11/925,194

(22) Filed: Oct. 26, 2007

(65) Prior Publication Data

US 2009/0109592 A1 Apr. 30, 2009

(51) Int. Cl.
*H02H 7/20* (2006.01)

(52) U.S. Cl. ....................... 361/112; 361/117; 361/118; 361/126; 361/127; 361/131; 337/30

(58) Field of Classification Search ................. 361/117, 361/118, 126, 127, 131; 337/30–31, 33–35; 338/21, 22 R See application file for complete search history.

(56) References Cited

U.S. PATENT DOCUMENTS

| | | | | |
|---|---|---|---|---|
| 2,034,204 | A | 3/1936 | Pittman | |
| 2,109,733 | A | 3/1938 | Pittman et al. | |
| 2,296,708 | A | 9/1942 | Earle | |
| 2,330,918 | A | 10/1943 | Pittman | |
| 2,453,719 | A | 11/1948 | McFarlin | |
| 2,777,095 | A | 1/1957 | Stoelting | |
| 3,291,937 | A | 12/1966 | Carothers et al. | |
| 3,644,791 | A | 2/1972 | Carothers et al. | |
| 3,702,419 | A | 11/1972 | Carothers et al. | |
| 3,710,212 | A * | 1/1973 | Marek et al. | 361/125 |
| 3,777,662 | A | 12/1973 | Pendegrass | |
| 3,869,650 | A | 3/1975 | Cunningham et al. | |
| 4,001,651 | A | 1/1977 | Kershaw, Jr. | |
| 4,204,238 | A | 5/1980 | Stetson | |
| 4,282,557 | A | 8/1981 | Stetson | |
| 4,320,432 | A | 3/1982 | Duenke | 361/39 |
| 4,397,919 | A | 8/1983 | Ballard | |
| 4,404,614 | A | 9/1983 | Koch et al. | 361/128 |
| 4,471,402 | A | 9/1984 | Cunningham | |
| 4,609,902 | A | 9/1986 | Lenk | |
| 4,656,555 | A | 4/1987 | Raudabaugh | |
| 4,663,692 | A | 5/1987 | Carothers et al. | 361/117 |
| 4,734,823 | A | 3/1988 | Cunningham | |

(Continued)

FOREIGN PATENT DOCUMENTS

GB 2332106 A 9/1999

OTHER PUBLICATIONS

Surge Arrestors Ultrasil Housed VariSTAR Surge Arresters 5 kA IEC 60099-4 (IEC 99-4) for MV Systems to 36kV Jan. 2006; pp. 1-16; Cooper Power Systems.

(Continued)

*Primary Examiner*—Stephen W Jackson
*Assistant Examiner*—Terrence R Willoughby
(74) *Attorney, Agent, or Firm*—King & Spalding LLP

(57) ABSTRACT

A housing encapsulating first and second terminals of a surge arrester disconnector becomes structurally weakened before activation of a disconnect device in the disconnector when the disconnector is exposed to heat, thereby preventing the disconnector from producing a projectile with a force sufficient to classify the disconnector as a hazardous material under Department of Transportation regulations.

26 Claims, 4 Drawing Sheets

U.S. PATENT DOCUMENTS 4,930,039 A 5/1990 Woodworth et al.
4,975,797 A 12/1990 Veverka et al.
5,113,167 A 5/1992 Raudabaugh ................ 337/30
5,113,306 A 5/1992 Veverka et al.
5,434,550 A 7/1995 Putt
5,594,613 A 1/1997 Woodworth et al.
5,708,555 A 1/1998 Woodworth et al.
5,952,910 A 9/1999 Krause
6,231,404 B1 5/2001 Lichy ......................... 439/811
6,657,842 B2 12/2003 Krause
6,667,871 B2 12/2003 Berlovan et al.
6,828,895 B1 12/2004 Huo et al.
6,847,514 B2 1/2005 Ramarge et al.
6,876,289 B2 4/2005 Lenk et al.
6,887,942 B2 5/2005 Chen
6,956,458 B2 10/2005 Lenk et al.
7,301,096 B2 11/2007 Woodworth et al.
2005/0088795 A1* 4/2005 Lenk et al. .................. 361/118
2007/0297114 A1 12/2007 Woodworth et al.
2008/0068122 A1* 3/2008 Lenk et al. .................... 337/30

OTHER PUBLICATIONS

Surge Arrestors Ultrasil Housed VariSTAR Surge Arresters 10 kA Class 2 -IEC 60099-4 for MV Systems to 30kV Installation and Service Instructions; Apr. 2003; pp. 1-2; Cooper Power Systems.

ABB Polim Surge Arrester Family: The answer to Overvoltage Protection Problems in MV Systems; 6 pages from INMR Quarterly Review Website: Nov./Dec. 2002: No. 6; INMR Quarterly Review.

Chase, K., “Firearms A Global History to 1700”, 2003, Chapter I, Cambridge University Press, Cambridge, United Kingdom.

* cited by examiner

FIRE SAFE ARRESTER ISOLATOR

FIELD OF THE INVENTION

The invention relates generally to high voltage electrical power generation and transmission systems, and more specifically to the safe transportation and storage of surge arresters having a heat activated disconnector.

BACKGROUND

Electrical power transmission and distribution equipment is subject to voltages within a fairly narrow range under normal operating conditions, and the equipment may operate at high voltages of, for example, 1000V or greater. However, system disturbances, such as lightning strikes and switching surges, may produce momentary or extended voltage levels that greatly exceed the levels experienced by the equipment during normal operating conditions. These voltage variations often are referred to as over-voltage conditions. If not protected from over-voltage conditions, critical and expensive equipment, such as transformers, switching devices, computer equipment, and electrical machinery, may be damaged or destroyed by such over-voltage conditions and associated current surges. Accordingly, it is routine practice for system designers to use surge arresters to protect system components from dangerous over-voltage conditions.

A surge arrester is a protective device that is commonly connected in parallel with a comparatively expensive piece of electrical equipment to divert over-voltage-induced current safely around the equipment, thereby protecting the equipment and its internal circuitry from damage. The surge arrester normally operates in a high impedance mode that provides a low current path to ground having a relatively high impedance. In this mode, normal current at the system frequency is directed to the electrical equipment and is prevented from following the surge current to ground along the current path through the surge arrester. When exposed to an over-voltage condition, the surge arrester operates in a low impedance mode that provides a high current path to electrical ground having relatively low impedance. When the surge arrester is operating in the low-impedance mode, the impedance of the current path is substantially lower than the impedance of the equipment being protected by the surge arrester. In this mode, current from the over-voltage condition is directed to ground and not to the electrical equipment. Upon completion of the over-voltage condition, the surge arrester returns to operation in the high impedance mode. The surge arrester also includes a disconnector that disconnects the surge arrester from ground if the over-voltage condition is too extreme or continues too long.

FIG. 1 is a partial cross-sectional view of a conventional high voltage surge arrester 90. As illustrated in FIG. 1, the high voltage surge arrester 90 typically includes an elongated outer enclosure or housing 100 made of an electrically insulating material, a pair of electrical terminals 102, 104 at opposite ends of the enclosure 100 for connecting the arrester between a line-potential conductor (not shown) and electrical ground (not shown), respectively, and a stack or array of other electrical components 106 that form a series electrical path between the terminals 102 and 104. Terminal studs 108, 110 connect to the line and ground terminals 102 and 104, respectively. An insulated mounting bracket or hanger 114 also may be provided for mounting of the arrester 90 to, for example, another piece of equipment or to a utility pole.

To prevent short circuiting of line potential conductors connected to the surge arrester 90, a disconnector 112 is provided on the ground terminal stud 110. The disconnector 112 may include an internal resistor or other electrical element connected in parallel with a spark gap assembly and a charged black powder in an unprimed .22 caliber cartridge that is heat activated. Thus, in the event of a sustained over-voltage current flow through the terminal stud 110, a spark is generated by the spark gap assembly of the disconnector 112. Heat from the spark detonates the charged powder cartridge to mechanically sever electrical connection between the terminal stud 110 and the lower terminal 104 in the housing 100, thereby isolating the terminal stud 110 from the line connection. The force created by the activation of the charged powder cartridge typically causes the terminal stud 110 to separate from the surge arrester 90, thereby effectively isolating the failed arrester from the power system.

Undesirably, portions of the heat sensitive disconnector 112, including the terminal stud 110, can become a projectile when the cartridge is inadvertently exposed to heat during shipping, transit, or storage. During transport and storage, if an accident or other occurrence results in a fire near one or more arresters, activation of the charged powder cartridges of the disconnectors in the arresters can be hazardous to first responders at the scene of the fire. Projectiles attributable to detonation of the charged powder cartridges of the disconnectors in such circumstances are of particular concern, particularly when a large number of arresters with such disconnectors are shipped and stored. A variety of different types of conventional surge arresters with disconnectors are vulnerable to the hazards noted above. Additionally, similar problems may be experienced by all disconnector devices. The problems noted above are therefore not considered unique to any particular disconnector or to any particular surge arrester.

In light of the hazards posed by arresters when subjected to a fire during shipping, transit, or storage, the United States Department of Transportation (DOT) has classified conventional surge arresters as hazardous materials that must be transported in accordance with DOT hazardous material transportation regulations. Transporting arresters under those guidelines increases the cost of such transportation. Alternatively, the DOT safety regulations can be met by fitting arresters with restraints that prevent the terminal stud and portions of the disconnectors from becoming projectiles when the disconnector cartridge is inadvertently exposed to heat during shipping, transit, or storage. However, adding such restraints increases the cost of arresters. Another option is to package the arresters in sturdy metallic cases during shipping, transit, or storage to meet the DOT requirements, though such packaging may be prohibitively expensive.

Accordingly, a need in the art exists for a surge arrester disconnector that is not classified as a hazardous material under DOT regulations.

SUMMARY OF THE INVENTION

The invention provides an inexpensive and practical way to prevent the terminal studs and other portions of a heat-sensitive arrester disconnector from becoming forceful projectiles when the disconnector is exposed to excessive heat during shipping, transit, or storage. In accordance with one aspect of the invention, the terminal studs of the disconnector are encapsulated in a housing comprising materials that melt or burn at a temperature that is lower than the activation temperature of the disconnector's disconnect cartridge. The activation temperature of the cartridge is the temperature at which the propellant in the cartridge ignites. The activation temperature is sometimes referred to as the auto-ignition temperature. When the arrester encounters rising temperature caused by fire during shipping, transit, or storage, the disconnector housing materials melt or burn away before the increasing temperature causes activation of the cartridge. As the housing melts or burns away, the terminal studs of the disconnector are released. Thus, when the cartridge does activate, the terminal studs, or other portions of the disconnector, are not projected by the explosion created by the cartridge.

According to another aspect of the invention, the terminal studs of the disconnector are encapsulated in a housing comprising materials that become sufficiently weakened at a temperature that is lower than the activation temperature of the disconnector's disconnect cartridge. When the arrester encounters rising temperature caused by fire during shipping, transit, or storage, the temperature sufficiently weakens the walls of the disconnector housing or the adhesive holding the disconnector housing together before the increasing temperature causes activation of the cartridge. Thus, when the cartridge does activate, the explosive force from the activated cartridge does not produce a large pressure increase within the disconnector because the weakened walls do not contain the expanding gases from the cartridge. In this case, the explosive force for the activated cartridge is not sufficient to produce projectiles of the magnitude required for classification as a hazardous material by the DOT.

According to yet another aspect of the invention, the terminal studs of the disconnector are encapsulated in a housing comprising materials that melt or burn, or are sufficiently weakened, during a fire prior to activation of the disconnector's disconnect cartridge. Because the cartridge is encapsulated in the disconnector's housing, the cartridge will experience a slower rise in temperature than the housing during a fire. Accordingly, the housing can comprise materials that melt or burn, or are sufficiently weakened, at a temperature that is above the activation temperature of the cartridge, as long as the housing materials melt, burn, or become weakened before the temperature inside the disconnector increases to the activation temperature of the cartridge.

These and other aspects, objects, and features of the invention will become apparent from the following detailed description of the exemplary embodiments, read in conjunction with, and reference to, the accompanying drawings.

DETAILED DESCRIPTION OF EXEMPLARY EMBODIMENTS

The invention allows for safe detonation of a disconnect cartridge in a disconnector of a surge arrester in the event of fire during transportation and storage. The disconnector's housing comprises materials that melt, burn, or otherwise become weakened during a fire before the fire causes activation of the cartridge, thereby allowing the disconnector's terminal studs safely to detach from the disconnector before activation of the cartridge or preventing a more forceful explosion. Such action prevents the terminal studs or other portions of the disconnector from being discharged as forceful projectiles when the cartridge is activated. When the cartridge eventually discharges, parts of the disconnector are not projected at speeds or distances that qualify as a DOT classified hazardous material.

The following description of exemplary embodiments refers to the attached drawings, in which like numerals indicate like elements throughout the figures.

Figure 2:
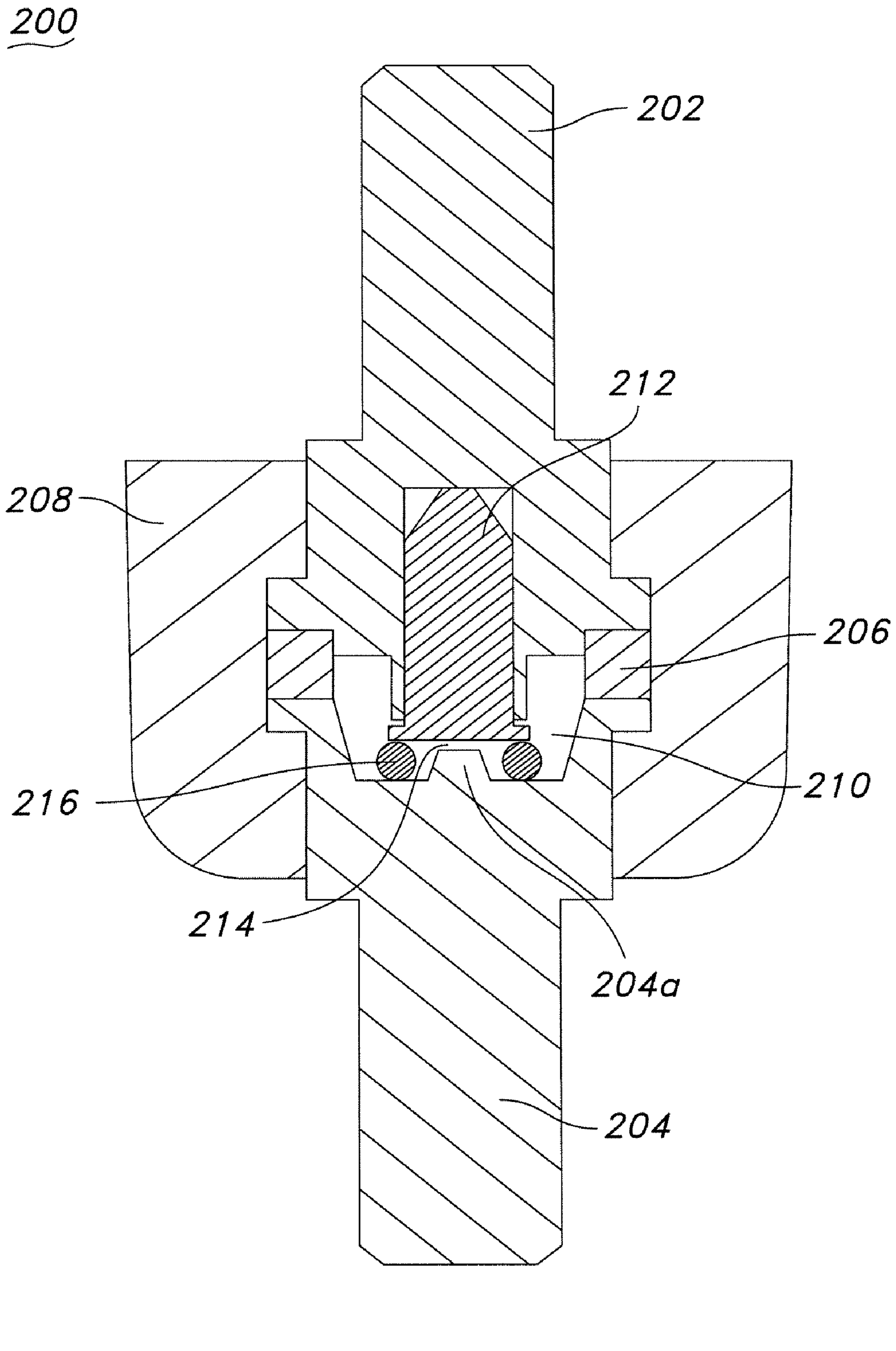
FIG. 2 is a cross-sectional view of an arrester disconnector according to an exemplary embodiment.

FIG. 2 is a cross-sectional view of an arrester disconnector 200 according to an exemplary embodiment of the invention. The disconnector 200 comprises two terminal studs 202, 204 separated by an electrical element 206. In exemplary embodiments, the electrical element 206 can comprise a resistor, a capacitor, a varistor, an insulator, or combinations of two or more of these items. A housing 208 encapsulates the terminal studs 202, 204 and the electrical element 206, thereby creating a sealed chamber 210 between the terminal studs 202, 204. A disconnect cartridge 212 is disposed within a recess of the terminal stud 202 and is positioned with an end adjacent to a projection **204*a* of the terminal stud 204 such that an air gap 214 is created between the projection 204*a* and the cartridge 212. An o-ring 216 is compressed between the terminal stud 204 and the cartridge 212**.

Figure 1:
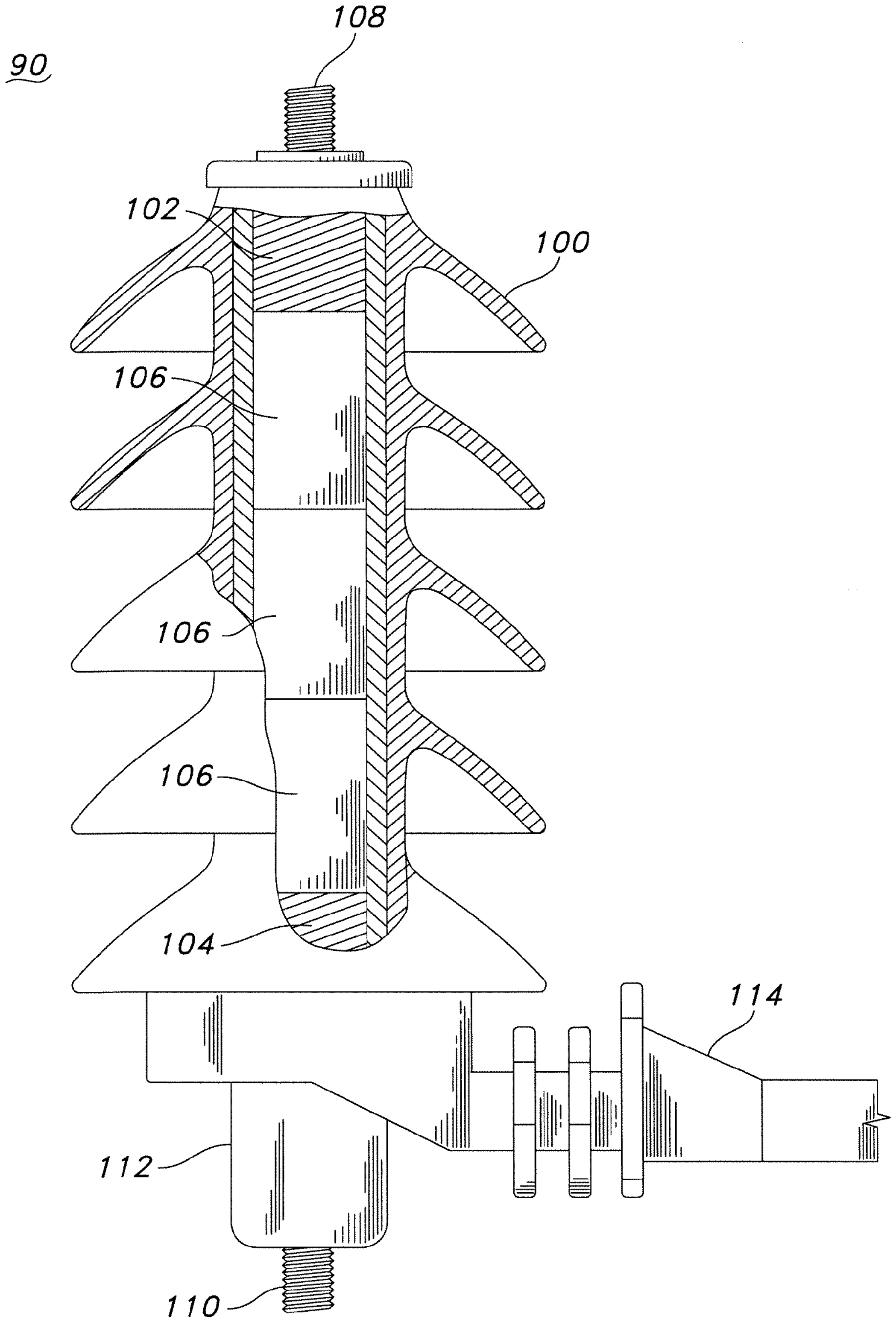
FIG. 1 (PRIOR ART)
FIG. 1 is a partial cross-sectional view of a conventional high voltage surge arrester with a heat-activated disconnector.

In an exemplary embodiment, when used in conjunction with a surge arrester, such as the surge arrester 100 illustrated in FIG. 1, the terminal stud 204 can be the ground terminal stud 110 of the surge arrester. Additionally, the terminal stud 202 can be coupled to the electrical terminal 104 in the housing of the surge arrester.

The terminal studs 202, 204 are formed of conductive materials, such as stainless steel. The electrical element 206 is designed to resist current flow during normal voltage conditions in which a particular disconnector 200 is operated.

The disconnect cartridge 212 can comprise a .22 caliber cartridge having a black powder actuated charge. For example, the powder charge can comprise a Q2065 propellant sold under the WINCHESTER trademark.

In a surge arrester operating under normal voltage conditions, the surge arrester operates in a high-impedance mode that provides a low current path to ground having relatively high impedance. Because of the high-impedance of the current path caused by the electrical components 106 of the surge arrester, relatively little, if any, current is directed to ground. Accordingly, in this mode, current is directed to the electrical equipment to which the surge arrester is connected.

Figure 3:
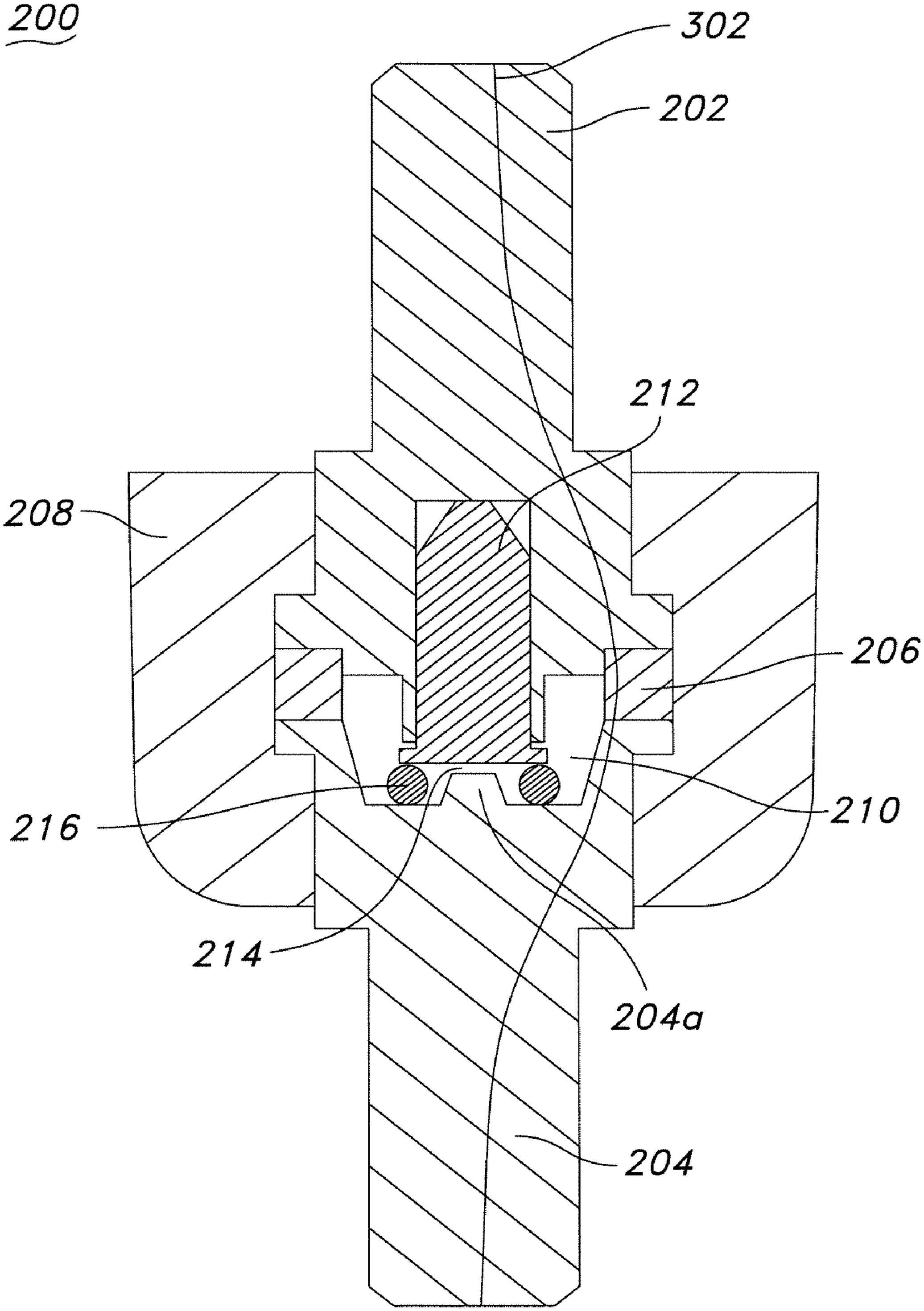
FIG. 3 is a cross-sectional view of the arrester disconnector of FIG. 2 illustrating a current path during a transient over-voltage condition according to an exemplary embodiment of the invention.

FIG. 3 is a cross-sectional view of the arrester disconnector 200 of FIG. 2 illustrating a current path 302 during a transient over-voltage condition according to an exemplary embodiment of the invention. If a transient over-voltage condition occurs in a surge arrester comprising the disconnector 200, the electrical components 106 of the surge arrester operate in a low-impedance mode to direct the over-voltage through the disconnector 200 to ground. In this operation, current through the disconnector 200 follows the current path 302 through terminal stud 202, electrical element 206, and terminal stud 204 to ground via a ground wire (not shown). When the over-voltage conditions ends, the electrical components 106 again operate in the high-impedance mode to direct current to the electrical equipment to which the arrester having the disconnector 200 is connected.

If the electrical components 106 of the surge arrester fail, the surge arrester 200 operates in a low-impedance mode that provides a high current path to electrical ground having relatively low impedance. When the surge arrester is operating in the low-impedance mode, the impedance of the current path is substantially lower than the impedance of the equipment being protected by the surge arrester in which the disconnector 200 is disposed.

Figure 4:
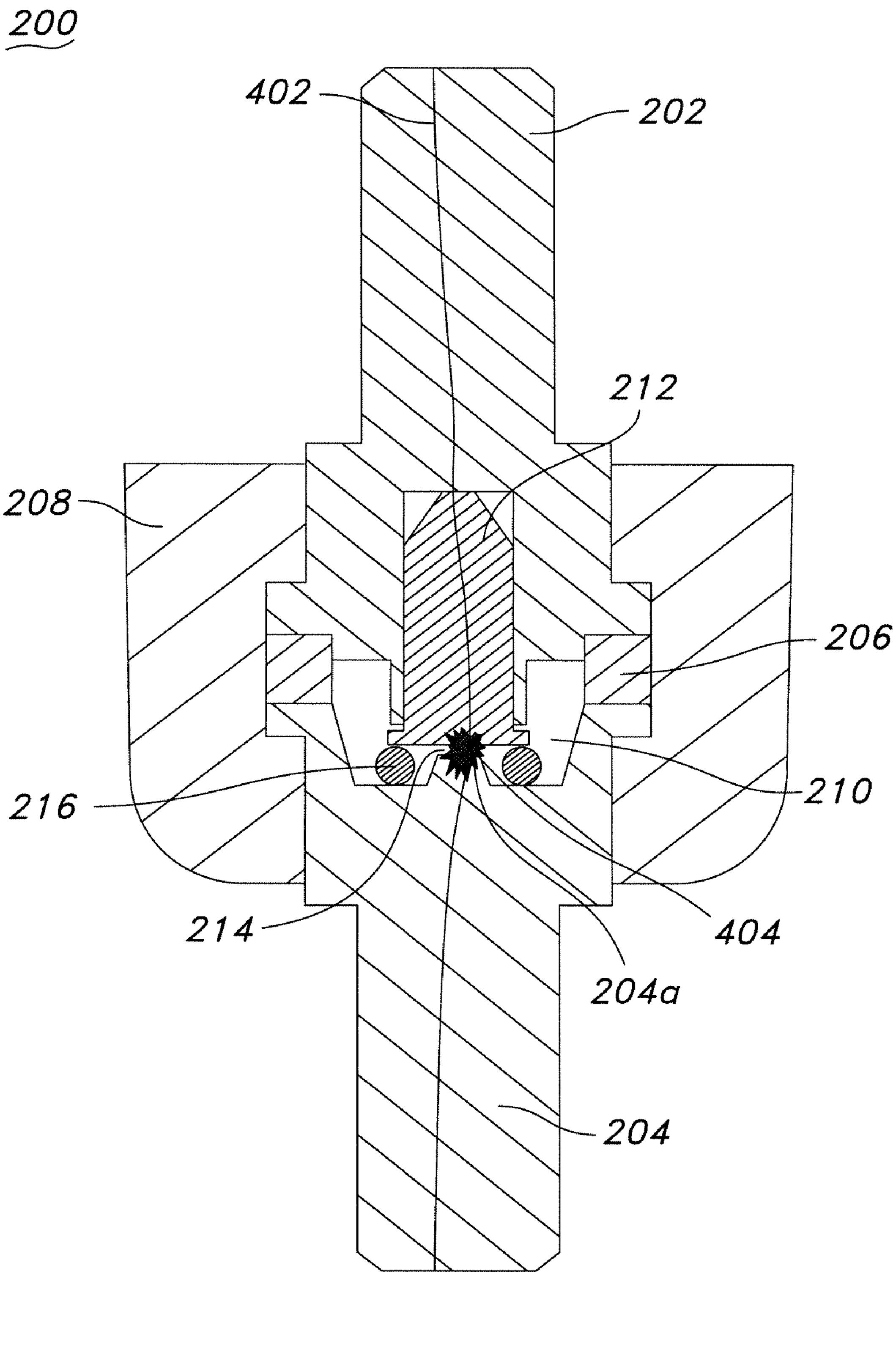
FIG. 4 is a cross-sectional view of the arrester disconnector of FIG. 2 illustrating a current path in a low-impedance, over-voltage fault current mode according to an exemplary embodiment.

When the surge arrester in which the disconnector 200 is disposed fails, then a fault current can be directed through the current path 302. Initially, the fault current is directed to ground via the current path 302 as described previously for the transient over-voltage condition. However, a continuous fault current will follow a current path 402 illustrated in FIG. 4 by arcing across the air gap 214 in the disconnector 200 to bypass the electrical element 206. FIG. 4 is a cross-sectional view of the arrester disconnector 200 of FIG. 2 illustrating the current path 402 in a low-impedance, over-voltage fault current mode according to an exemplary embodiment of the invention.

As illustrated in FIG. 4, when the disconnector 200 encounters the continuous fault current, the available fault current follows the current path 402 through the terminal stud 202, the cartridge 212, and the terminal stud 204 (via the protrusion 204*a*) to ground via a ground wire (not shown). This current path 402 sparks a detonating arc 404 in the air gap 214 between the projection 204*a* of the terminal stud 204 and the end of the cartridge 212.

The detonating arc 404 supplies heat energy sufficient to detonate the propellant in the cartridge 212. The detonation of the cartridge 212 initially is contained in the sealed chamber 210. However, the pressure within the sealed chamber 210 increases until the force created by the detonation causes the housing 208 to fracture, which can project pieces of the housing 208 into the surrounding area. Additionally, the force created by the detonation projects the terminal stud 204 away from the disconnector 200, thereby severing the current path 402. The failed arrester in which the disconnector 200 is disposed is thereby effectively isolated from ground.

Because activation of the cartridge 212 in the disconnector 200 produces a projectile (the terminal stud 204 and/or fragments from the housing 208) with a certain force, the DOT could classify the disconnector 200 as a hazardous material because of the potential for the cartridge 212 to activate in the event of a fire during shipping, transit, or storage. However, the disconnector 200 comprises safeguards to prevent the forceful projection of the terminal stud 204 and housing 208 fragments.

In an exemplary embodiment, the housing 208 comprises at least one material having a lower melting point and/or ignition point than the activation temperature of the cartridge 212. The activation temperature of the cartridge 212 is the temperature at which the propellant in the cartridge 212 ignites. The activation temperature is sometimes referred to as the auto-ignition temperature. In this embodiment, the terminal studs 202, 204 are disposed in the housing 208 comprising at least one material that melts or ignites at a relatively lower temperature with respect to the activation temperature of the cartridge 212. At least a portion of the housing 208 melts or burns during a fire before heat from the fire causes the cartridge to activate, thereby allowing the terminal studs 202, 204 and housing 208 materials safely to detach from the disconnector 200 before activation of the cartridge 212. Such action prevents the terminal studs 202, 204, the housing 208, or other portions of the disconnector 200 from being discharged as forceful projectiles when the cartridge 212 activates. Thus, when the cartridge 212 eventually discharges, parts of the disconnector 200 are not projected at speeds or distances that qualify as a DOT classified hazardous material.

In an exemplary embodiment, the entirety of the housing 208 comprises a material having a lower melting point and/or ignition point than the activation temperature of the cartridge 212. Alternatively, only joints in the housing 208 or that seal the housing 208 to the terminal studs 202, 204 and the electrical element 206 comprise the material having a lower melting point and/or ignition point than the activation temperature of the cartridge 212. In this embodiment, as the material in the joints burns or melts, the housing 208 opens and/or falls away from the disconnector 200. In another alternative embodiment, the housing 208 comprises a material having a lower melting point and/or ignition point than the activation temperature of the cartridge 212 while the joints comprise a different material.

In another exemplary embodiment, the housing 208 comprises at least one material that becomes sufficiently weakened at a temperature that is lower than the activation temperature of the cartridge 212. In this embodiment, the terminal studs 202, 204 of the disconnector 200 are encapsulated in a housing 208 comprising at least one material that becomes sufficiently weakened at a temperature that is lower than the activation temperature of the cartridge 212. When the disconnector 200 encounters rising temperature caused by fire during shipping, transit, or storage, the temperature sufficiently weakens the walls of the housing 208 or its joints before the increasing temperature causes activation of the cartridge 212. Thus, when the cartridge 212 does activate, the explosive force from the activated cartridge 212 does not produce a large pressure increase within the sealed chamber 210 of the disconnector 200 because the weakened walls or joints of the housing 208 do not contain the expanding gases from the cartridge 212. In this case, the explosive force for the activated cartridge 212 is not sufficient to produce projectiles of the magnitude required for classification of the disconnector 200 as a hazardous material by the DOT.

In an exemplary embodiment, the entirety of the housing 208 comprises a material that becomes sufficiently weakened at a temperature that is lower than the activation temperature of the cartridge 212. Alternatively, only joints in the housing 208 or that seal the housing 208 to the terminal studs 202, 204 and the electrical element 206 comprise the material that becomes sufficiently weakened at a temperature that is lower than the activation temperature of the cartridge 212. In this embodiment, the material in the joints provides the weakened structure that prevents the housing 208 from containing the expanding gases from the cartridge 212. In another alternative embodiment, the housing 208 comprises material that becomes sufficiently weakened at a temperature that is lower than the activation temperature of the cartridge 212 while the joints comprise a different material.

In another exemplary embodiment, the housing 208 comprises at least one material that melts or burns, or is sufficiently weakened, during a fire prior to activation of the disconnector's cartridge 212. In this embodiment, the terminal studs 202, 204 of the disconnector 200 are encapsulated in a housing 208 comprising at least one material that melts or burns, or is sufficiently weakened, during a fire prior to activation of the disconnector's cartridge 212. Because the cartridge 212 is encapsulated in the housing 208, the cartridge 212 will experience a slower rise in temperature than the housing 208 during a fire. Accordingly, the housing 208 (and/or its joints) can comprise materials that melt or burn, or are sufficiently weakened, at a temperature that is above the activation temperature of the cartridge 212, but the housing 208 materials melt, burn, or become weakened before the temperature inside the disconnector 200 increases to the activation temperature of the cartridge 212 to detonate the cartridge 212.

Exemplary materials suitable for the housing 208, including the joints, include epoxy, PVC, other thermo-plastic materials, or any suitable material having the melting, burning, or weakening characteristics described herein.

In an exemplary embodiment, the auto-ignition point of the propellant in the cartridge 212 is approximately 190 degrees centigrade. Accordingly, the housing 208 materials will melt, ignite, or become sufficiently weakened at a temperature that is less than 190 degrees centigrade. Alternatively, the housing 208 materials will melt, ignite, or become sufficiently weakened at a temperature that is above 190 degrees centigrade but before the temperature of the cartridge 212 in the disconnector 200 reaches 190 degrees centigrade during a fire.

The disconnector 200 according to the exemplary embodiments described herein can be used with any surge arrester employing such isolation functions. Additionally, the housing 208 described herein can be used with any disconnector to provide a fire safe function for such disconnector.

The foregoing exemplary embodiments enable a fire safe arrester disconnector. Many other modifications, features, and embodiments will become evident to a person of ordinary skill in the art having the benefit of the present disclosure. It should be appreciated, therefore, that many aspects of the invention were described above by way of example only and are not intended as required or essential elements of the invention unless explicitly stated otherwise. It should also be understood that the invention is not restricted to the illustrated embodiments and that various modifications can be made within the spirit and scope of the following claims.

What is claimed is:

1. An arrester disconnector, comprising:

a line terminal stud;

a ground terminal stud;

an electrical element disposed between the line terminal stud and the ground terminal stud;

a disconnect cartridge having an activation temperature and disposed to disconnect at least one of the line terminal stud and the ground terminal stud when activated; and a housing that encapsulates at least a portion of the line terminal stud, the ground terminal stud, and the electrical element, wherein the line terminal stud, the electrical element, and the ground terminal stud encapsulated by the housing define a sealed chamber adjacent to the cartridge, wherein the housing becomes structurally weakened prior to activation of the cartridge when the disconnector is exposed to heat, and wherein the structural weakening of the housing destroys the sealed chamber.

2. The disconnector of claim 1, wherein the housing comprises at least one material having at least one of a melting point and an ignition point that is lower than the activation temperature of the cartridge.

3. The disconnector of claim 2, wherein the at least one material melts or burns when exposed to the heat at a temperature that is less than the activation temperature of the cartridge, thereby structurally weakening the housing and causing the encapsulation of the ground terminal stud by the housing to fail.

4. The disconnector of claim 1, wherein the housing comprises at least one material that becomes weakened at a temperature that is lower than the activation temperature of the cartridge.

5. The disconnector of claim 1, wherein the housing comprises at least one material that becomes weakened at a temperature that is higher than the activation temperature of the cartridge, and wherein a temperature of the cartridge remains less than the activation temperature until after the at least one material becomes weakened when the disconnector is exposed to heat.

6. The disconnector of claim 1, wherein the structural weakening of the housing reduces an explosive effect caused by activation of the cartridge.

7. The disconnector of claim 1, wherein the cartridge comprises a propellant that ignites at the activation temperature.

8. The assembly of claim 1, wherein the disconnector is coupled to a surge arrester.

9. The disconnector of claim 1, wherein a portion of the cartridge is disposed within a bore of the line stud or the ground stud.

10. The disconnector of claim 1, wherein the electrical element is selected from the group consisting of resistors, capacitors, varistors, insulators, and combinations thereof.

11. A surge arrester assembly, comprising:

a surge arrester; and a disconnector coupled to the surge arrester and configured to sever electrical connection of the surge arrester to ground, the disconnector comprising:

a line stud;

a ground stud;

an electrical element disposed between the line stud and the ground stud;

a disconnect cartridge having an activation temperature and disposed to disconnect at least one of the line stud and the ground stud from the disconnector when activated to thereby sever electrical connection of the surge arrester to ground; and a housing that encapsulates at least a portion of the line terminal stud, the ground terminal stud, and the electrical element, wherein the line terminal stud, the electrical element, and the ground terminal stud encapsulated by the housing define a sealed chamber adjacent to the cartridge, wherein the housing becomes structurally weakened prior to activation of the cartridge when the disconnector is exposed to heat, and wherein the structural weakening of the housing destroys the sealed chamber.

12. The surge arrester assembly of claim 11, wherein the housing comprises at least one material having at least one of a melting point and an ignition point that is lower than the activation temperature of the cartridge.

13. The surge arrester assembly of claim 12, wherein the at least one material melts or burns when exposed to the heat at a temperature that is less than the activation temperature of the cartridge, thereby structurally weakening the housing and causing the encapsulation of the ground terminal stud by the housing to fail.

14. The surge arrester assembly of claim 11, wherein the housing comprises at least one material that becomes weakened at a temperature that is lower than the activation temperature of the cartridge.

15. The surge arrester assembly of claim 11, wherein the housing comprises at least one material that becomes weakened at a temperature that is higher than the activation temperature of the cartridge, and wherein a temperature of the cartridge remains less than the activation temperature until after the at least one material becomes weakened when the disconnector is exposed to heat.

16. The surge arrester assembly of claim 11, wherein the structural weakening of the housing reduces an explosive effect caused by activation of the cartridge.

17. The surge arrester assembly of claim 11, wherein the cartridge comprises a propellant that ignites at the activation temperature.

18. The surge arrester assembly of claim 11, wherein a portion of the cartridge is disposed within a bore of the line stud or the ground stud.

19. The surge arrester assembly of claim 11, wherein electrical element is selected from the group consisting of resistors, capacitors, varistors, insulators, and combinations thereof.

20. An arrester disconnector, comprising:

a housing; and a disconnect cartridge having an activation temperature and disposed within at least a portion of the housing, wherein the housing defines a sealed chamber adjacent to the cartridge, wherein the housing comprises at least one material that becomes structurally weakened prior to activation of the cartridge when the disconnector is exposed to heat, and wherein the structural weakening of the housing destroys the sealed chamber.

21. The disconnector of claim 20, wherein the housing comprises at least one material having at least one of a melting point and an ignition point that is lower than the activation temperature of the cartridge.

22. The disconnector of claim 20, wherein the housing comprises at least one material that becomes weakened at a temperature that is lower than the activation temperature of the cartridge.

23. The disconnector of claim 20, wherein the housing comprises at least one material that becomes weakened at a temperature that is higher than the activation temperature of the cartridge, and wherein a temperature of the cartridge remains less than the activation temperature until after the at least one material becomes weakened when the disconnector is exposed to heat.

24. The disconnector of claim 20, wherein the structural weakening of the housing reduces an explosive effect caused by activation of the cartridge.

25. The disconnector of claim 20, wherein the cartridge comprises a propellant that ignites at the activation temperature.

26. The disconnector of claim 20, wherein the disconnector is coupled to a surge arrester.

* * * * *